United States Patent
Delva et al.

(10) Patent No.: US 8,077,219 B2
(45) Date of Patent: Dec. 13, 2011

(54) INTEGRATED CIRCUIT HAVING A CIRCUIT FOR AND METHOD OF PROVIDING INTENSITY CORRECTION FOR A VIDEO

(75) Inventors: Justin G. Delva, Burlington, MA (US); Mohammed Sharaf Ismail Sayed, Zagazig (EG)

(73) Assignee: Xilinx, Inc., San Jose, CA (US)

( * ) Notice: Subject to any disclaimer, the term of this patent is extended or adjusted under 35 U.S.C. 154(b) by 508 days.

(21) Appl. No.: 12/370,519

(22) Filed: Feb. 12, 2009

(65) Prior Publication Data

US 2010/0201883 A1  Aug. 12, 2010

(51) Int. Cl.
- *H04N 5/235* (2006.01)
- *H04N 5/20* (2006.01)
- *H04N 5/57* (2006.01)
- *G06K 9/40* (2006.01)

(52) U.S. Cl. .............. 348/230.1; 348/255; 348/687; 382/274

(58) Field of Classification Search ........... 348/216.1, 348/229.1, 230.1, 251, 255, 256, 678, 679, 348/687; 382/274

See application file for complete search history.

(56) References Cited

U.S. PATENT DOCUMENTS

| | | | |
|---|---|---|---|
| 7,590,303 B2 * | 9/2009 | Lee et al. | 382/274 |
| 7,602,988 B2 * | 10/2009 | Li | 382/254 |
| 7,684,639 B2 * | 3/2010 | Zhao et al. | 382/274 |
| 7,684,640 B2 * | 3/2010 | Zhao et al. | 382/274 |
| 7,856,141 B2 * | 12/2010 | Li | 382/167 |
| 7,885,462 B2 * | 2/2011 | Paik | 382/168 |
| 2004/0228530 A1 * | 11/2004 | Schwartz et al. | 382/173 |
| 2007/0047834 A1 | 3/2007 | Connell | |
| 2007/0280555 A1 * | 12/2007 | Chen | 382/294 |
| 2008/0137935 A1 * | 6/2008 | Spahn | 382/132 |
| 2008/0144962 A1 * | 6/2008 | Jung et al. | 382/274 |
| 2009/0002564 A1 * | 1/2009 | Barnhoefer et al. | 348/687 |
| 2010/0278423 A1 * | 11/2010 | Itoh et al. | 382/169 |
| 2011/0177841 A1 * | 7/2011 | Attwood | 455/556.1 |

OTHER PUBLICATIONS

Jagatheeswari et al.; "Contrast Stretching Recursively Separated Histogram Equilization for Brightness Preservation and Contrast Enhancement"; Dec. 2009; International Conference on Advances in Computing, Control, & Telecommunication Technologies, 2009; pp. 111-115.*

Kamikura et al.; "Global brightness-variation compensation for video coding"; Dec. 1998; IEEE Transactions on Circuits and Systems for Video Technology; vol. 8, Issue 8; pp. 988-1000.*

R. Gonzalez and R. Woods, "Digital Image Processing," New Jersey: Prentice-Hall Inc., 2001, Chapter 3, Image Enhancement in the Spatial Domain, pp. 88-95.

U.S. Appl. No. 12/370,532, filed Feb. 12, 2009, Justin G. Delva.

(Continued)

*Primary Examiner* — John Villecco (74) *Attorney, Agent, or Firm* — John J. King (57) ABSTRACT

A method of providing intensity correction for a video is disclosed. The method may comprise evaluating a portion of a frame of the video; determining a difference in intensity of a current block of the frame with the corresponding block of the previous frame; correcting all blocks of the frame with local intensity correction if a first set of parameters is met; and correcting the current block of the frame with both global intensity correction and local intensity correction if the first set of parameters is not met. An integrated circuit having a circuit for providing intensity correction for a video is also disclosed.

20 Claims, 6 Drawing Sheets

OTHER PUBLICATIONS

Forbin G. et al., "Flicker compensation for Archived Film Using a Spatially-adaptive Nonlinear Model", Acoustics, Speech and Signal Processing, 2006, ICASSP 2006 Proceedings, 2006 IEEE International Conference on Toulouse, France May 14-19, 2006, Piscataway, NJ, USA.

Hsueh-Yen Yang et al., "Algorithm and architecture design of adaptive brightness correction for video application", IEEE Transactions on Consumer Electronics, vol. 54, No. 4, Nov. 1, 2008, pp. 1858-1866, IEEE Service Center, NY, NY, USA.

P.J. Withagen, K. Schutte, and F.C.A. Groen, "Global intensity correction in dynamic scenes," IAS technical report IAS-UVA-07-01, 2007.

K. K. Wong, A. Das, and M. N. Chong, "Improved flicker removal through motion vectors compensation," in Proc. IEEE Third International Conference on Image and Graphics, Dec. 2004, pp. 552-555.

Y. Cai, K. Huang, T. Tan, and Y. Wang, "Context enhancement of nighttime surveillance by image fusion," in Proc. IEEE $18^{th}$ International Conference on Pattern Recognition, 2006, pp. 980-983.

E. P. Bennett and L. McMillan, "Video enhancement using per-pixel virtual exposures," in Proc. of ACM SIGGRAPH, vol. 24, Jul. 2005, 8 pages.

R. Gonzalez and R. Woods, "Digital Image Processing," New Jersey: Prentice-Hall Inc., 2001, 4 pages.

A.J Lipton, H. Fujimori and R.S. Patil, "Moving target classification and tracking from real-time video," in Proc. IEEE Workshop Application of Computer Vision, pp. 8-14, 1998.

R.T. Collins, A.J. Lipton, T. Kanade, H . . . , "A System for Video Surveillance and Monitoring," in the Robotic Institute of Carnegie Mellon University and the Sarnoff Corporation report, 2000, 69 pages.

C. Stauffer and W. Grimson, "Adaptive background mixture models for real time tracking," in Computer Visionand Pattern Recognition, 1999, pp. 246-252.

Q. Zang and R. Klette, "Object Classification and Tracking in Video Surveillance," in CAIP proceedings of the 10'th International Conference, 2003, 8 pages.

P. Kaew, .T.K Pong and R. Bowden, "An improved adaptive background mixture model for real-time tracking with shadow detection." IEEE Proceedings of the $2^{nd}$ European Workshop on Advanced Video Based Surveillance Systems, Sep. 2001, 5 pages.

H. Jiang, V. Owall and H. Ardo, "Real-time Video Segmentation with VGA Resolution and Memory Bandwidth Reduction," Proceedings of the IEEE International Conference on Video and Signal Based Surveillance(AVSS'06) 2006, 6 pages.

J.C.S. Jacques, Jr., C. R. Jung, and S. R. Musse, "Background Subtraction and Shadow Detection in Grayscale Video Sequences", CROMOS Laboratory, PIPCA, Proceedings of the XVIII Brazilian Symposium on computer Graphics and Image Processing (SIBGRAPI'05), IEEE Computer Society, 2005 IEEE, 8 pages.

\* cited by examiner

INTEGRATED CIRCUIT HAVING A CIRCUIT FOR AND METHOD OF PROVIDING INTENSITY CORRECTION FOR A VIDEO

FIELD OF THE INVENTION

The present invention relates generally to integrated circuits, and in particular, to a method of providing intensity correction for a video.

BACKGROUND OF THE INVENTION

The video surveillance market has seen an increase in demand over the last few years in response to a drop in pricing and improvement of camera technology. Improved capabilities of digital recording devices and new computing platforms capable of video analytics have also contributed to the increase in demand. Applications of video surveillance systems range from intrusion protection to monitoring and tracking of activities in both a known enclosed environment or an unknown dynamic environment, such as in aerial surveillance applications. Further, the need for better video resolution created an interest in using high definition (HD) rates for video surveillance.

Integrated circuits are an integral part of any electronic device including surveillance equipment. A variety of integrated circuits are often used together to enable the operation of the electronic device, such as a video surveillance network. While integrated circuits are typically designed for a particular application, certain integrated circuits may have configurable logic. For example, an application specific integrated circuit (ASIC) may have portions comprising configurable logic. Another type of integrated circuit which has configurable logic is a programmable logic device (PLD). A programmable logic device is designed to be user-programmable so that users may implement logic designs of their choices. One type of programmable logic device is a Complex Programmable Logic Device (CPLD). A CPLD includes two or more "function blocks" having a two-level AND/OR structure connected together and to input/output (I/O) resources by an interconnect switch matrix. Another type of programmable logic device is a field programmable gate array (FPGA). In a typical FPGA, an array of configurable logic blocks (CLBs) is coupled to programmable input/output blocks (IOBs). The CLBs and IOBs are interconnected by a hierarchy of programmable routing resources. For both of these types of programmable logic devices, the functionality of the device is controlled by configuration data bits of a configuration bitstream provided to the device for that purpose.

As with any electronic system, there is always a desire to increase the quality and reduce the cost of the system. While a system capturing video data may be used with any type of integrated circuit, image quality and the amount of data required to be processed pose significant problems in implementing the system to meet customer needs.

SUMMARY OF THE INVENTION

A method of providing intensity correction for frames of a video is disclosed. The method may comprise evaluating a portion of a frame of the video; determining a difference in intensity of a current block of the frame with the corresponding block of a previous frame; correcting all blocks of the frame with local intensity correction if a first set of parameters is met; and correcting the current block of the frame with both global intensity correction and local intensity correction if the first set of parameters is not met. Correcting all blocks of the frame with local intensity correction if the first set of parameters is met may comprise determining if the difference in the intensity of the current block of the frame and the corresponding block of the previous frame exceeds a predetermined threshold and a global gain factor is outside a predetermined range. Correcting the current block of the frame with both global intensity correction and local intensity correction comprises correcting the current block of the frame using a global gain factor; determining a difference in intensity of the current block of the frame with the corresponding block of the previous frame after correcting the current block of the frame using the global gain factor; and determining whether to correct the current block of a frame using local intensity correction.

According to an alternate embodiment, a method of providing intensity correction for frames of a video comprises evaluating a portion of a frame of the video; determining a difference in intensity of a current block of the frame with the corresponding block of a previous frame; correcting the current block of the frame using a global gain factor if the difference in intensity of the corrected current block of the frame and the corresponding block of the previous frame is less than a predetermined threshold or the global gain factor is within a predetermined range; determining a difference in intensity of the current block of the frame and a corresponding block of the previous frame after correcting the current block of the frame using the global gain factor; and determining whether to correct the current block of the frame using local intensity correction. Local intensity correction may be performed on a block-by-block basis for each block of the frame if the difference in intensity of the current block of the frame and the corresponding block of the previous frame exceeds a second predetermined threshold and the global gain factor is outside a predetermined range.

An integrated circuit having a circuit for providing intensity correction for frames of a video is also disclosed. The integrated circuit comprises a buffer coupled to receive frames of data associated with the video; a processor coupled to the buffer, the processor analyzing a portion of a frame of the video, wherein the processor corrects all of the blocks of the frame with local intensity correction if the difference in the intensity of a corrected portion of the frame and a corresponding portion of the previous frame is greater than a predetermined threshold and a global gain factor is outside a predetermined range; and a memory coupled to the processor, the memory receiving corrected intensity coefficients for the frame generated by the processor.

DETAILED DESCRIPTION OF THE DRAWINGS

Figure 1:
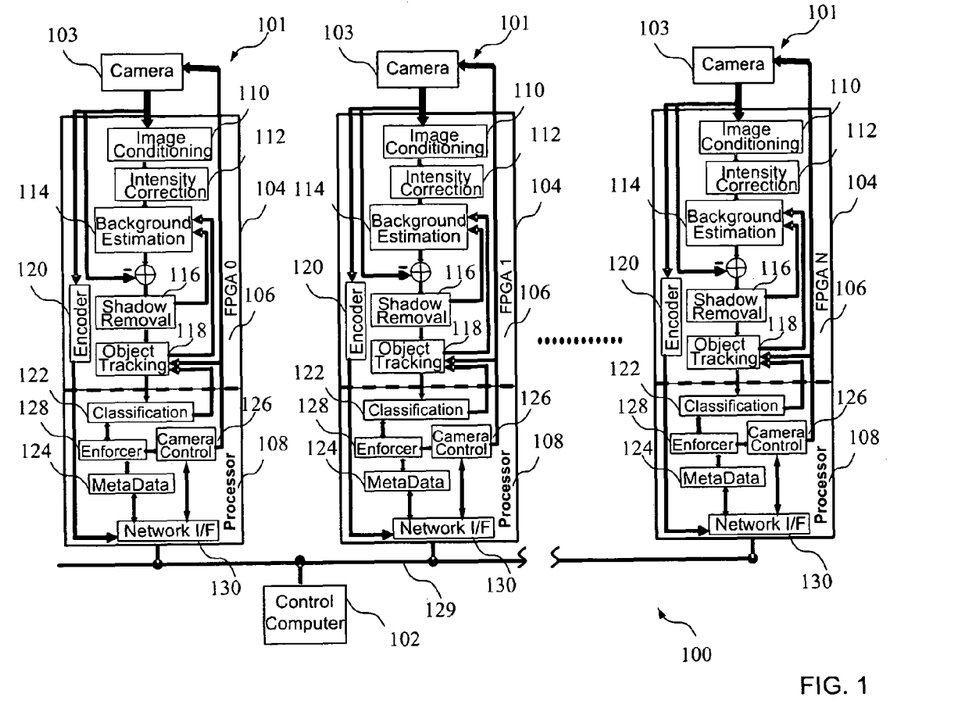
FIG. 1 is a block diagram of a surveillance system according to an embodiment the present invention.

Turning first to FIG. 1, a block diagram of a surveillance system according to an embodiment of the present invention is shown. As shown in FIG. 1, a surveillance system 100 comprises a plurality of similar camera systems 101 coupled to a control computer 102. Each camera system 101 comprises a camera 103 which is commonly available and may generate a video image according to a predefined standard, such as a high definition television (HDTV) standard. The camera is coupled to a data processing block 104 of the camera system which may comprise an integrated circuit 106 having programmable logic and a processor 108. As will be described in more detail below, the processor may be incorporated in the integrated circuit having programmable logic. An image conditioning block 110 interfaces with the camera to perform de-interlacing if necessary, up/down conversion of the input data rate if necessary, and global motion compensation for image stabilization and inter-frame alignment. Alternatively, the camera may provide the features of the image conditioning block. An intensity correction block 112 automatically adjusts to lighting changes caused by both the environment and the self-adjustments functions of the camera, and maintains a smooth intensity transition between frames. A background estimation block 114 determines the background in the presence of clutter and moving objects, and enables clean foreground segmentation in order to detect moving objects, as will be described in more detail below. The background estimation block 114 generates an estimate of the background. A shadow removal block 116 prevents shadows from being detected as foreground, while an object tracking block 118 allows the movement of detected objects to be tracked between frames. That is, an object which is tracked may be identified by changes in the pixels associated with an object over time, where the changes meet predetermined criteria to qualify as a moving object. In order to generate the object tracking information, the background and any shadows related to the object are removed. An encoder 120 compresses the video stream before being sent to the network channel. The control computer may then use the object tracking information with a decompressed video signal to more easily identify objects of interest, with improved resolution, over a long span of time.

Low bandwidth classification information, such as the object tracking information, may be generated in the classification block 122 and stored along with metadata in a metadata buffer 124. The metadata may include, for example, the date the video was taken and details of the camera settings, such as lens, focal length, aperture, shutter timing, and white balance. The processor 108 may also provide camera control functions 126 in response to an enforcer 128. A network interface 130 provides the encoded video data, metadata and camera control information to the network communication link 129. The control computer 102 is coupled to the network communication link 129 to receive data from a network interface 130 for each of the camera systems 101. The control computer could be any type of general purpose computer having a monitor for displaying an image for one or more of the camera systems. The communication link 129 may be a part of any type of wired or wireless communication network, such as a telecommunication network, or data network, such as a local area network (LAN) or a wide area network (WAN). The low bandwidth functions may be relegated to a processor external to the integrated circuit, which may be for example an integrated circuit having programmable logic, or an embedded processor core of an integrated circuit having programmable logic, such as an FPGA having an embedded processor core. While the data processing block 104 is shown separate from the camera, any part or the entire data processing block may be incorporated in the camera. Similarly, while the control computer 102 is shown separate from the camera systems, the control computer may be incorporated in one or more of the camera systems.

By employing the data processing block 104 with the camera systems of the surveillance system, a low cost surveillance system is implemented. However, in order to provide beneficial object tracking information, intensity correction, background estimation and shadow removal must be performed. By implementing the high processing bandwidth functions such as intensity correction and background estimation for each camera, the processing intensive functions may be implemented remote from the control computer to provide object tracking, where compressed data representing the video image and the object tracking information is provided to the control computer.

Figure 2:
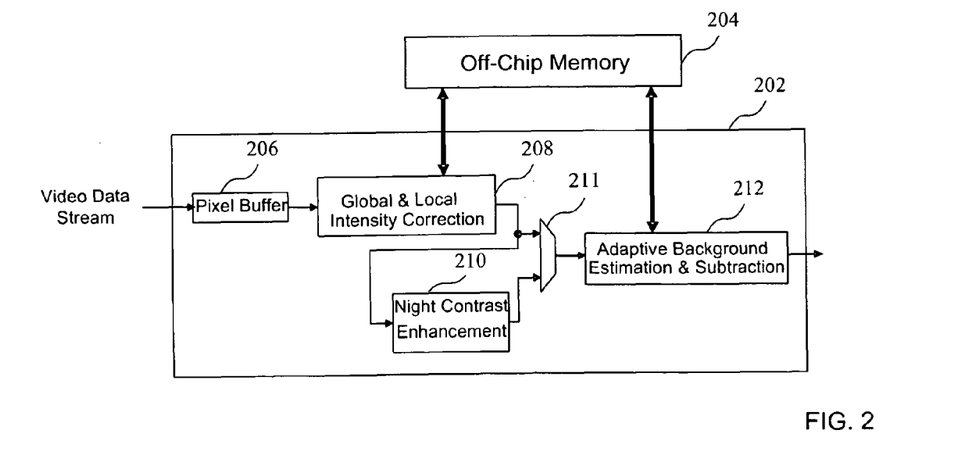
FIG. 2 is a block diagram of an integrated circuit coupled to a memory for receiving parameters for pixels of a video image according to an embodiment of the present invention.

Turning now to FIG. 2, a block diagram of an integrated circuit coupled to a memory for receiving parameters for pixels of a video image according to an embodiment of the present invention is shown. The integrated circuit 202 comprises a hardware accelerator which provides both an intensity correction block and a background estimation and subtraction block. In particular, the integrated circuit 202 may be coupled to an off-chip memory 204 for storing the data generated by the integrated circuit 202. A pixel buffer 206 is coupled to receive the output of an image conditioning circuit, such as the image conditioning circuit 110. The output of the pixel buffer is coupled to a global and local intensity correction block 208. Either the output of the global and local intensity correction block 208 or data processed by a night contrast enhancement block 210 is selected by a multiplexer 211 and coupled to an adaptive background estimation and subtraction block 212. As will be described in more detail below, the circuit of FIG. 2 performs video segmentation on HD sequences without the need to store frames, therefore providing an efficient circuit in terms of external memory bandwidth. The circuit is also small in terms of real-estate on the integrated circuit, and may be used broadly in the surveillance market.

Receptors in the human eye are only capable of detecting light having wavelengths from 400 nm to 700 nm. These receptors are called cones and are of three different types, including one for red light, one for green light and one for blue light. If a single wavelength of light is observed, the relative responses of these three receptors allow us to discern what we call the color of the light. This phenomenon is extremely useful because it enables generating a range of colors by simply adding together various proportions of light from just three different wavelengths. The process, known as additive color matching, is utilized in color television systems, where a resulting image to be displayed is broken down into an array of picture elements or pixels to be displayed.

Generally, each pixel displays a proportion of red, green or blue color. The representation of an image in red, blue and green is commonly referred to as RBG. However, transmitting or storing these RBG color components requires significant bandwidth, and integrated circuits may have a more difficult time processing the data, such as the large volume of data in a high definition television (HDTV) image. Accordingly, luminance and color difference coding is often used to reduce the bandwidth of an image to be displayed. For example, the YUV format contains a Y portion representing a luminance component (also known as Luma) associated with brightness, and U and V portions representing chrominance components (also know as Chroma 1 and Chroma 2) associated with color. In addition to reducing bandwidth, the YUV format models human perception of color more closely than the standard RBG format. YUV420 means that for every four luma (Y) bytes there are two chroma bytes (alternating Cr and Cb). Even with the reduced bandwidth provided by the YUV format, the HDTV format has significant data requirements. An HDTV frame may have 1920×1080 pixels and may use six times the bandwidth of traditional standard-definition TV. Accordingly, any reduction in the amount of data stored as a background image would be beneficial.

As shown in FIG. 2, global and local intensity correction and adaptive background estimation and subtraction are implemented to generate parameters associated with a background portion of an image. A video comprises a sequence of images, also know as frames. Background estimation algorithms based on interframe difference are error prone when dealing with varying background scenes. Methods performing temporal median filtering of pixels require substantial frame buffering, thus making them unattractive to highly dynamic scenes. While adaptive background methods based on obtaining an online temporal mean of a pixel require less frame buffering, a pixel may have more than one mean over time in real scenes, where each mean is representative of the pixel's different background modes. Such a pixel is multimodal and is not properly characterized as such when using a single statistical representation in an online averaging scheme. An adaptive method which uses a mixture of normal distributions to model a multi-modal background image sequence may be used. For each pixel, each normal distribution in its background mixture corresponds to the probability of observing a particular intensity or color in the pixel. This is consistent with scenes in which the background clutter is generated by more than one surface appearing in the pixel's view. Each surface is represented by a normal distribution having a mean equal to the surface intensity or color and a variance due to surface texture, illumination fluctuations or camera noise. According to the circuit of FIG. 3, reduced data transfer requirements may also be achieved by employing intensity correction using both global intensity correction and local intensity correction. That is, because local intensity corrections are processing intensive, the methods of providing global and local intensity corrections set forth below may also reduce the update requirements for intensity values for pixels, and therefore reduce the bandwidth required to transmit data.

Figure 3:
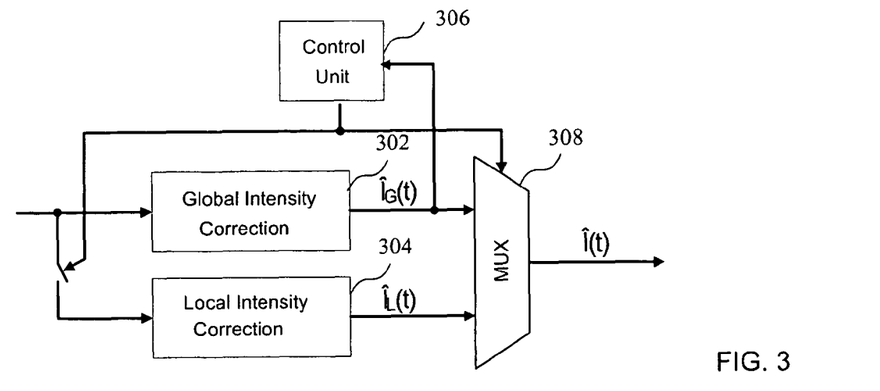
FIG. 3 is a block diagram of a circuit for selecting a format for correcting the image intensity of a frame according to an embodiment of the present invention.

FIG. 3 is a block diagram of a circuit for selecting a format for correcting the image intensity of a frame according to an embodiment of the present invention. In particular, a global intensity correction block 302 and a local intensity correction block 304 are coupled to receive an input signal, and generate modified intensity values for pixels $\hat{I}_G(t)$ and $\hat{I}_L(t)$, respectively. A control unit 306 may be used to control a multiplexer 308 for selecting the correct values to be generated as the modified intensity values $\hat{I}(t)$. As will be described in more detail below, the selection of global intensity correction and local intensity correction may be performed to minimize the amount of local intensity correction, which is processor intensive, to minimize the data processing requirements when processing a video image.

Video surveillance systems generally perform well in a well-constrained environment where there is a full control over the lighting conditions. Since most of the algorithms used in video surveillance and moving object detection and tracking assume constant image intensity, changes in the environment lighting may affect the performance of these algorithms. Changes in the image intensity may be classified into global and local intensity changes. Global intensity changes are balanced changes which affect the whole frame evenly. For example, global intensity changes may be caused by illumination changes due to lights switching on or off, or by clouds moving in front of the sun. In addition, cameras employ a combination of techniques to optimally map reflected light to its digitizer's dynamic range, and may change the image intensity. Techniques commonly used are Automatic Gain Control (AGC) which is used to set the exposure in accordance to amount of lighting in the field of view, Automatic White Balancing which adapts the camera's reference to "true white" to correct the intensity of all colors, and Automatic Iris Control which is used to control the amount of light coming through the lens (i.e. exposure). In scenes with simultaneous dark and bright objects, the AGC may over/under compensate by being either too bright or too dark as it attempts to average the levels. Alternatively, local intensity changes may result in unbalanced changes which affect regions of the frame more than the rest of the frame, and may occur suddenly and for a short period of time such as camera flashes.

The image intensity may be modeled as follows:

$$I(t) = a(t)I_r(t) + N_{total}(t) \tag{1}$$

where $I(t)$ is the current image intensity, $I_r(t)$ is the reference image intensity, $a(t)$ is the apparent gain factor, and $N_{total}(t)$ is the total noise with zero-mean. Global intensity changes may be corrected using the apparent gain factor as shown in Equation 1.

$$\hat{I}(t) = \frac{Y(t)}{a(t)} \tag{2}$$

where $Y(t)$ is the observed image intensity and $\hat{I}(t)$ is the corrected image intensity. Two considerations are how to select the reference image $I_r(t)$ and how to compute $a(t)$.

The first frame of the sequence may be used as the reference image. Because using the first frame of the sequence as the reference image may not work quite well if the scene changes, it may be possible to renew the reference image periodically. For example, the reference image may be renewed either by selecting a reference image every few frames or by using the previous frame as a reference image. In either case, the reference image may be an uncorrected image or a previously corrected image. An uncorrected image may lead to a distorted output if the selected reference image was distorted, while a previously corrected image allows the propagation of the correction errors.

Four equations to compute the a(t) of Equation 2 may include:

$$a_{AofQ} = \frac{\sum_{s \in S} Y_s(t)}{\sum_{s \in S} \hat{I}_s(t-1)} \quad (3)$$

$$a_{MofQ} = \frac{M_{s \in S} Y_s(t)}{M_{s \in S} \hat{I}_s(t-1)} \quad (4)$$

$$a_{AofQ} = \frac{1}{|S|} \sum_{s \in S} \frac{Y_s(t)}{\hat{I}_s(t-1)} \quad (5)$$

$$a_{MofQ} = M_{s \in S} \frac{Y_s(t)}{\hat{I}_s(t-1)} \quad (6)$$

The quotient of average, quotient of median, average of quotient, and median of quotient are used in Equations 3-6 respectively to compute a(t). $Y_s(t)$ and $\hat{I}_s(t-1)$ are the observed intensity of the current frame and the corrected intensity of the previous frame respectively, while |S| is the number of pixels in the set of pixels S, and M denotes the median of a set of numbers.

The local intensity correction needs a more advanced model of the image intensity changes. The following equation provides an advanced model:

$$Y(x,y,t) = \alpha(x,y,t)I(x,y,t) - \beta(x,y,t) \quad (7)$$

where x and y are discrete spatial coordinates and t is the frame number. Y(x,y,t) and I(x,y,t) are the observed image intensity and the original image intensity respectively. α(x,y,t) and β(x,y,t) are the multiplicative and additive intensity changes parameters respectively.

If α(x,y,t) and β(x,y,t) are spatially smooth then they may be assumed to be constant locally:

$$\alpha(x,y,t) = \alpha_{m,n}(t) \; \beta(x,y,t) = \beta_{m,n}(t) \; \forall (x,y) \in \Omega_{m,n} \quad (8)$$

So for each region:

$$\alpha_{m,n}(t) = \frac{\sigma[Y(x,y,t)]}{\sigma[I(x,y,t)]} \beta_{m,n}(t) \quad (9)$$

$$= E[Y(x,y,t)] - \alpha_{m,n}(t)E[I(x,y,t)]$$

To a good approximation, the following are true for the stationary regions:

$$E[I(x,y,t)] \approx E[\hat{I}(x,y,t-1)] \quad (10)$$

$$\sigma[I(x,y,t)] \approx \sigma[\hat{I}(x,y,t-1)]$$

So an image may be corrected as follows:

$$\hat{I}(x,y,t) = \frac{Y(x,y,t) - \beta(x,y,t)}{\alpha(x,y,t)} \quad (11)$$

While more complicated manipulation is required for the regions with motion, image intensity correction is generally performed using a portion of a frame when motion is not present.

Figure 4:
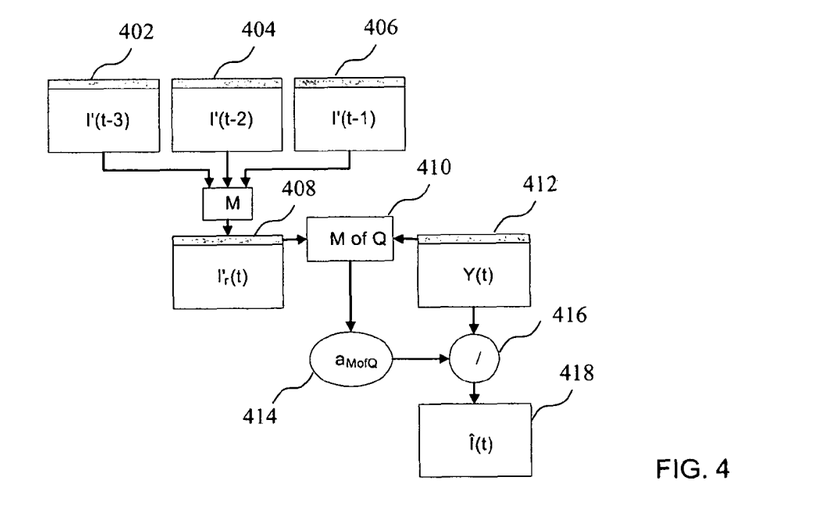
FIG. 4 is a block diagram showing global intensity correction according to an embodiment of the present invention.

FIG. 4 is a block diagram that shows a global intensity correction (GIC) according to an embodiment of the present invention. The GIC block has two stages: a correction stage shown in FIG. 4 and an update stage shown in FIG. 5. The correction stage is done using an apparent gain factor method, where the a(t) value may then be computed using the median of quotient equation as shown in Equation 6. To avoid storing whole frames for reference and the current images, only the top few rows of the current and the reference images are used to find the apparent gain factor a(t), which is used to correct the whole current frame Y(t). According to one embodiment, using the top few rows is sufficient to find a(t) since the top part of the frames is most likely part of the background. In addition, using the median of quotient equation of Equation 6 to find a(t) gives good results even without outlier removal. Accordingly, even if there is a moving object on the top part of the frames, the median of quotient equation to find a(t) is sufficient and only the top part of the frame may still be used to find a(t). Accordingly, typically the top five rows could be used to compute a(t).

To improve performance and to make the intensity correction more robust, the reference image is formed by taking the median of three previous images I'(t−1), I'(t−2), and I'(t−3) stored in buffers 402-406, respectively. A median I'$_r$(t) is then generated and stored in a buffer 408. An M of Q block 410 receives the median value I$_r$'(t) and current intensity value Y(t) of the input signal. The updated intensity value Î(t) is generated according to Equation 4, where only the top five rows of these frames are used to reduce the required memory size as discussed before. Each one of these frames may be either a corrected or uncorrected previous frame. This selection occurs in the update stage. Depending on more than one previous frame and not having all of them corrected or uncorrected frames help improve the performance and robustness of the intensity correction.

Figure 5:
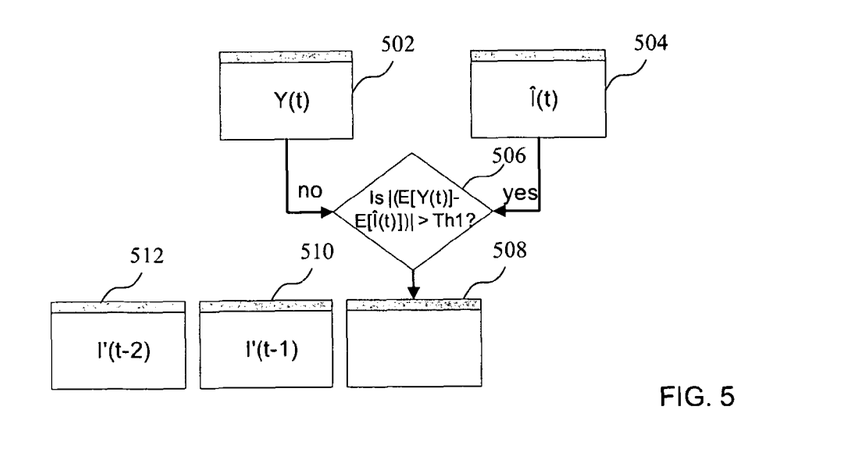
FIG. 5 is a block diagram showing updating intensity values for a frame according to an embodiment of the present invention.

Turning now to FIG. 5, block diagram shows updating intensity values for a frame according to an embodiment of the present invention. After the correction stage, the reference images are updated. The absolute difference between the mean of the top five rows of the current frame stored in a buffer 502 and the mean of the top five rows of the corrected frame stored in a buffer 504 is compared with a threshold Th1 as shown in the following Equation:

$$\text{abs}(E[Y(\text{rows}(1 \to 5))] - E[\hat{I}(\text{rows}(1 \to 5))]) > Th1 \quad (12)$$

If the absolute difference is greater than the threshold Th1 in the decision block 506, then the corrected frame is inserted in the reference stack in a buffer 508, after the previous values are stored in buffers 510 and 512. That is, if the absolute value of the difference is greater than the threshold, the original image Y(t) was distorted and it should not be used as part of the reference images. On the other hand if the absolute value of the difference is less than the threshold Th1, then it is better to use the original image Y(t) in the reference stack rather than the corrected image Î(t) to avoid propagating any correction errors. The value of Th1 may be selected by the user and is proportional to the camera movement speed, where a faster camera speed has a greater value of Th1.

Figure 6:
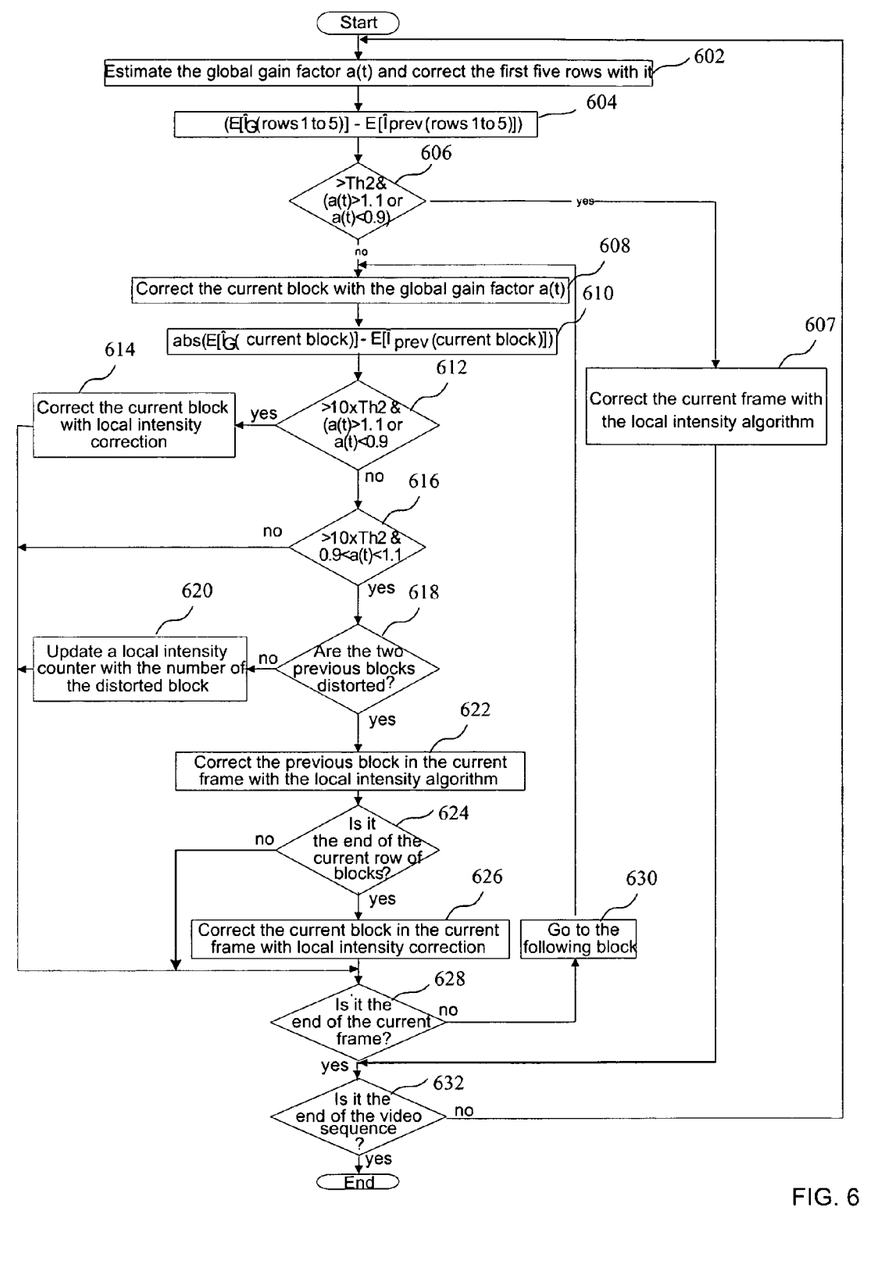
FIG. 6 is a flow chart showing a method of providing intensity correction for a video image according to an embodiment of the present invention.

Turning now to FIG. 6, a flow chart shows a method of providing intensity correction for a video image according to an embodiment of the present invention. Global intensity correction and local intensity correction are performed depending upon a comparison of a current frame with a previous frame. The GIC block corrects the current frame by using knowledge learned from previous frames. A statistically stationary area (SSA) is used to fully characterize each frame. For most video, the SSA is the area captured by the camera which consists of strips bordering the left, right and top boundaries of the frame. A portion of the frame having movement usually occupies the center of the frame, and is outside of the SSA. Accordingly, data in the SSA are less likely to contain parts of the moving object, and occurrences of moving objects are temporary and are effectively handled, as will be described in more detail below. A GIC block, such as the global intensity correction block 302, uses the first five rows of the current frame as the SSA, which is sufficient to determine the characteristics of the background image between frames. The GIC block estimates an apparent gain factor a(t) and uses it to correct the first five rows of the current frame at a step 602. The circuits for estimating the global gain factor and correcting the first five rows with it are described in FIGS. 4 and 5. The absolute difference between the average intensity of the first five rows of the corrected frame and the previous frame is determined at a step 604 and is compared with a threshold Th2 as shown in the following Equation:

$$\text{abs}(E[\hat{I}_G(\text{rows}(1\rightarrow 5))] - E[\hat{I}_{prev}(\text{rows}(1\rightarrow 5))]) > Th2 \qquad (13)$$

The value of Th2 is determined by the user. Using a small Th2 value causes local intensity correction to be used more often to correct the small local intensity changes, while using a large Th2 value causes local intensity correction to run only when there are large local intensity changes.

If the absolute difference is greater than Th2 and the apparent gain factor is outside a predetermined range (i.e. a(t)>1.1 or a(t)<0.9), there are local intensity changes which were not corrected by the GIC block. The original frame is then corrected using an LIC block, such as the local intensity block 304, at a step 607, where all blocks of the current frame will be corrected. That is, the frame with local intensity changes is divided into small square blocks such as blocks having an 8×8 pixel size. The correction parameters $\alpha_{m,n}(t)$ and $\beta_{m,n}(t)$ are estimated for each block, where the $\alpha_{m,n}(t)$ and $\beta_{m,n}(t)$ values are used to correct the image intensity. According to one embodiment, no advanced manipulation is used to deal with regions which incorporate motion. Local intensity correction is preferably not applied on every frame in order to reduce the computational cost of the intensity correction process. Because local intensity correction may introduce blurring artifacts in the frame, it is preferred that local intensity correction is not used unless it is required. While some blurring artifacts may be noticed in the regions with motion, the blurring artifacts do not deteriorate the efficiency of the blocks following the global and local intensity correction block as shown in FIG. 2, including the adaptive background estimation and subtraction block.

If the absolute difference is less than Th2 or the apparent gain factor is within a predetermined range (0.9<a(t)<1.1), the frame is divided into small blocks (e.g. 8×8 pixels). That is, the frame is divided into rows of blocks, and each block is corrected using the apparent gain factor a(t) and possibly using local intensity correction. The determination to correct each block is performed on a block-by-block basis. Each block is corrected with apparent gain factor a(t) at a step 608, and the absolute difference between the average intensity of the corrected block of the frame and the corresponding block of the previous frame is determined at a step 610. The absolute difference is then compared with a second threshold (e.g. 10×Th2) at a step 612. If it determined that the average intensity of the current block is much greater than the corresponding block in the previous frame and apparent gain factor is outside a predetermined range (i.e. a(t)>1.1 or a(t)<0.9), the current block is corrected with local intensity correction at a step 614.

If it is not determined that the average intensity of the current block is much greater than the corresponding block in the previous frame or that the apparent gain factor is outside a predetermined range (i.e. a(t)>1.1 or a(t)<0.9), it is then determined whether the average intensity of the current block is much greater than the corresponding block in the previous frame and apparent gain factor is within a predetermined range (i.e. 0.9<a(t)<1.1) at a step 616. If so, it is determined whether the two previous blocks are distorted at a step 618. If the two previous blocks are not distorted, a local intensity counter is updated with the number of the distorted block at a step 620. If the two previous blocks are distorted, the previous block in the current frame is corrected with local intensity correction at a step 622. It is then determined whether the end of a current row of blocks is reached at a step 624. If so, the current block in the current frame is corrected with local intensity correction at a step 626. It is then determined whether the end of the current frame has been reached at a step 628. That is, because each block is corrected if its previous and following blocks are distorted, the last block in a row is corrected if the previous block is distorted. If it is not the end of the current frame, it is determined that the next block needs to be processed at a step 630 and the next block is corrected with the apparent gain factor a(t) at the step 608. If the end of the frame is reached, it is determined whether the last frame of the video has been reached at the step 632. If additional frames of the video are to be processed, the process for the next frame begins again at step 602.

Figure 7:
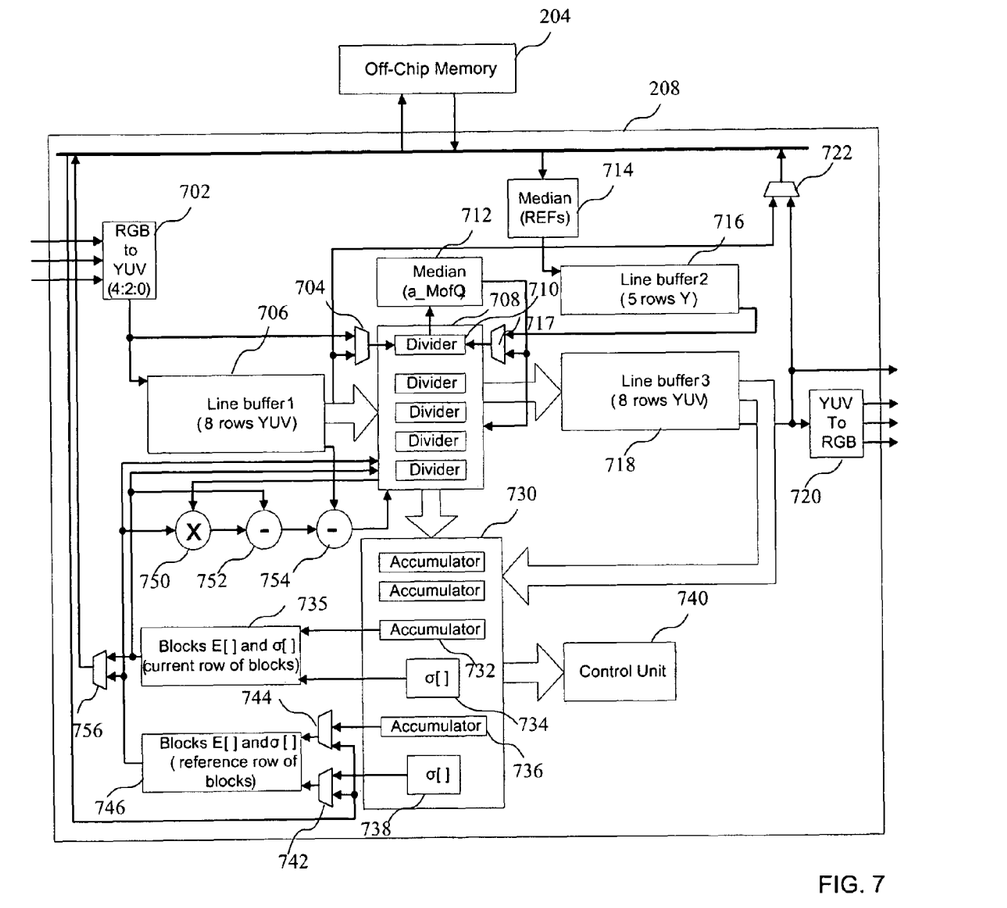
FIG. 7 is a block diagram of a circuit for providing global and local intensity correction according to an embodiment of the present invention.

Turning now to FIG. 7, a block diagram of a circuit for providing global intensity correction and local intensity correction according to an embodiment of the present invention is shown. The input to the global and local intensity correction block 208 is an RGB frame in raster scan order. The RGB frames are converted to YUV format and the color components are down sampled to 4:2:0 format to save memory for storing 8 rows of pixels in line buffers 1 and 3. While all the intensity correction steps process only the luminance component, the color components must be stored to convert the image back to the RGB format which is required for the following stages. The global and local intensity correction block 208 uses three line buffers to store the input, output, and reference pixels. It has two local memories to store the mean and standard deviation of both the current row of blocks from the current frame and the corresponding row of blocks from the reference frame (i.e., previous frame) required for local intensity correction. In addition, the external memory is used to store the top five rows of three previous frames (luminance only) for global intensity correction and the mean and the standard deviation of the 8×8 blocks of the reference frame for local intensity correction.

In particular, the global and local intensity correction circuit 208 is coupled to receive an RBG image and convert the image to a YUV image in a RGB-to-YUV converter 702, the output of which is coupled to a multiplexer 704 and a line buffer 706. The outputs of the multiplexer 704 and the line buffer 706 are coupled to an arithmetic logic block 708 having a plurality of divider circuits. The multiplexer 704 selects either the output of the RGB-to-YUV converter 702 or the line buffer 706, the output of which is coupled to a divider 710 which also receives the reference five rows through the line buffer 716. That is, a median value circuit 714 couples a median value of the top five rows of the three previous frames 402, 404, and 406 to the divider circuit 710 by way of a line buffer 716. An output of the arithmetic block is coupled to a line buffer 718, the output of which is coupled to a YUV-to-RGB converter 720. A multiplexer 722 is coupled to receive the output of either line buffer 706 or line buffer 718 and to provide a value to the external memory.

An arithmetic logic block 730 is also coupled to receive the output of the arithmetic logic block 708 and the output of the line buffer 718. As will be described in more detail below, the arithmetic blocks having dividers and accumulators may be used to perform the various calculations set forth above. The arithmetic logic block 730 comprises a first accumulator 732 and a first standard deviation circuit 734 are coupled to a block 735 for storing the mean values E[ ] and standard deviation values σ[ ] of the current row of blocks. Similarly, a second accumulator 736 and a second standard deviation circuit 738 are coupled to a block 746 for storing the mean values E[ ] and the standard deviation values σ[ ] of the reference row of blocks by way of multiplexers 742 and 744. The output of the block 746 is coupled to a multiplier 750, which provide an output to a subtractor 752, which is also coupled to receive the output of the block 735. The output of the subtractor 752 is coupled to a subtractor 754, which also receives an output of line buffer 706. The multiplier 750 receives an output of the divider block 708, while the output of the blocks 735 and 746 and the subtractor 754 are coupled to the divider 708. Finally, one of the outputs of the block 735 or the block 746 is selected by a multiplexer 756, the output of which may be coupled to the off-chip memory 204.

The operation includes an initialization process where the top five rows of the first three frames of the video sequence are stored in the external memory. The median of these five rows of the three frames are estimated and stored in the line buffer 716. The average intensity of the top five rows of the third frame is then computed. The third frame is divided into 8×8 blocks, and the mean and the standard deviation of the blocks are computed and stored in the external memory. For each new frame, the mean and the standard deviation of one reference row of blocks are read from the external memory and stored in the line buffer 716. The new frame pixels for 8 rows (i.e., one row of 8×8 blocks) in line buffer 1 are then read. One of the dividers is used to compute $Y(t)/I'_r(t-1)$, as set forth above in Equation 4. A MofQ is found by estimating the median of the quotients computed in the previous step. Five dividers are used to correct the top five rows of the current frame with MofQ value ($a_{MofQ}$) and store them in line buffer 718. The average intensity of the top five rows of the corrected frame is then computed. The mean and the standard deviation of the current row of 8×8 blocks is also computed using the arithmetic logic block 730. A control unit 740 will make the decisions for each 8×8 block, where each block will be corrected either with global apparent gain factor and/or with the local intensity correction parameters.

Figure 8:
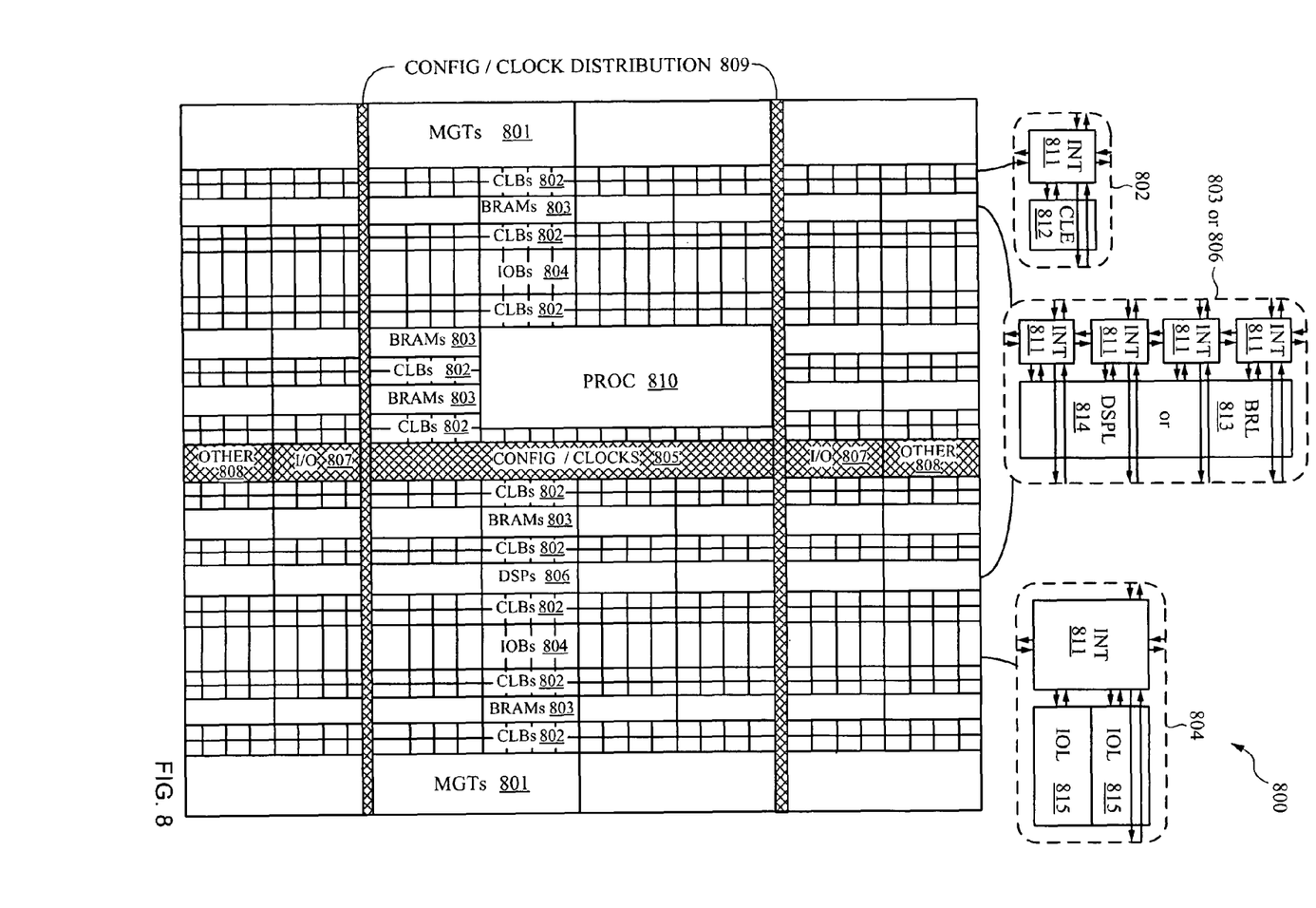
FIG. 8 is a block diagram of a programmable logic device for implementing the circuits of FIGS. 1-7 according to an embodiment of the present invention.

Turning now to FIG. 8, a block diagram of a programmable logic device for implementing the circuits of FIGS. 1-7 according to an embodiment of the present invention is shown. The device of FIG. 8 comprises an FPGA architecture 800 having a large number of different programmable tiles including multi-gigabit transceivers (MGTs 801), configurable logic blocks (CLBs 802), random access memory blocks (BRAMs 803), input/output blocks (IOBs 804), configuration and clocking logic (CONFIG/CLOCKS 805), digital signal processing blocks (DSPs 806), specialized input/output blocks (I/O 807) (e.g., configuration ports and clock ports), and other programmable logic 808 such as digital clock managers, analog-to-digital converters, system monitoring logic, and so forth. Some FPGAs also include dedicated processor blocks (PROC 810). The various memories of FIG. 7 may be implemented in BRAMS or distributed memory of the CLEs. The arithmetic logic blocks may be implemented in the DSP blocks, while the control unit 740 may be implemented in a dedicated processor block.

In some FPGAs, each programmable tile includes a programmable interconnect element (INT 811) having standardized connections to and from a corresponding interconnect element in each adjacent tile. Therefore, the programmable interconnect elements taken together implement the programmable interconnect structure for the illustrated FPGA. The programmable interconnect element (INT 811) also includes the connections to and from the programmable logic element within the same tile, as shown by the examples included at the top of FIG. 8.

For example, a CLB 802 may include a configurable logic element (CLE 812) that may be programmed to implement user logic plus a single programmable interconnect element (INT 811). A BRAM 803 may include a BRAM logic element (BRL 813) in addition to one or more programmable interconnect elements. The BRAM comprises dedicated memory separate from the distributed RAM of a configuration logic block. Typically, the number of interconnect elements included in a tile depends on the height of the tile. In the pictured embodiment, a BRAM tile has the same height as four CLBs, but other numbers (e.g., five) may also be used. A DSP tile 806 may include a DSP logic element (DSPL 814) in addition to an appropriate number of programmable interconnect elements. An IOB 804 may include, for example, two instances of an input/output logic element (IOL 815) in addition to one instance of the programmable interconnect element (INT 811). The location of connections of the device is controlled by configuration data bits of a configuration bitstream provided to the device for that purpose. As will be described in more detail below, the programmable interconnects, in response to bits of a configuration bitstream, enable connections comprising interconnect lines to be used to couple the various signals to the circuits implemented in programmable logic, or other circuits such as BRAMs or the processor.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the FPGA. Some FPGAs utilizing the architecture illustrated in FIG. 8 include additional logic blocks that disrupt the regular columnar structure making up a large part of the FPGA. The additional logic blocks may be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear, to facilitate the efficient implementation of user logic. The circuits and methods of the present invention may be implemented in the PLD of FIG. 8, or in any other suitable device, including any type of integrated circuit having programmable logic. In fact, the application area that maximizes the usage of FPGAs is in video analytics performed at the camera level. FIG. 1 shows an example of a linked camera system containing FPGAs that are networked together. The FPGAs perform the video analytics and are capable of controlling their respective camera. FPGAs are perfectly suited to tackle the challenges posed from the increase in bandwidth required to support the data rates for video surveillance, including the generation of video images at high definition (HD) rates.

Figure 9:
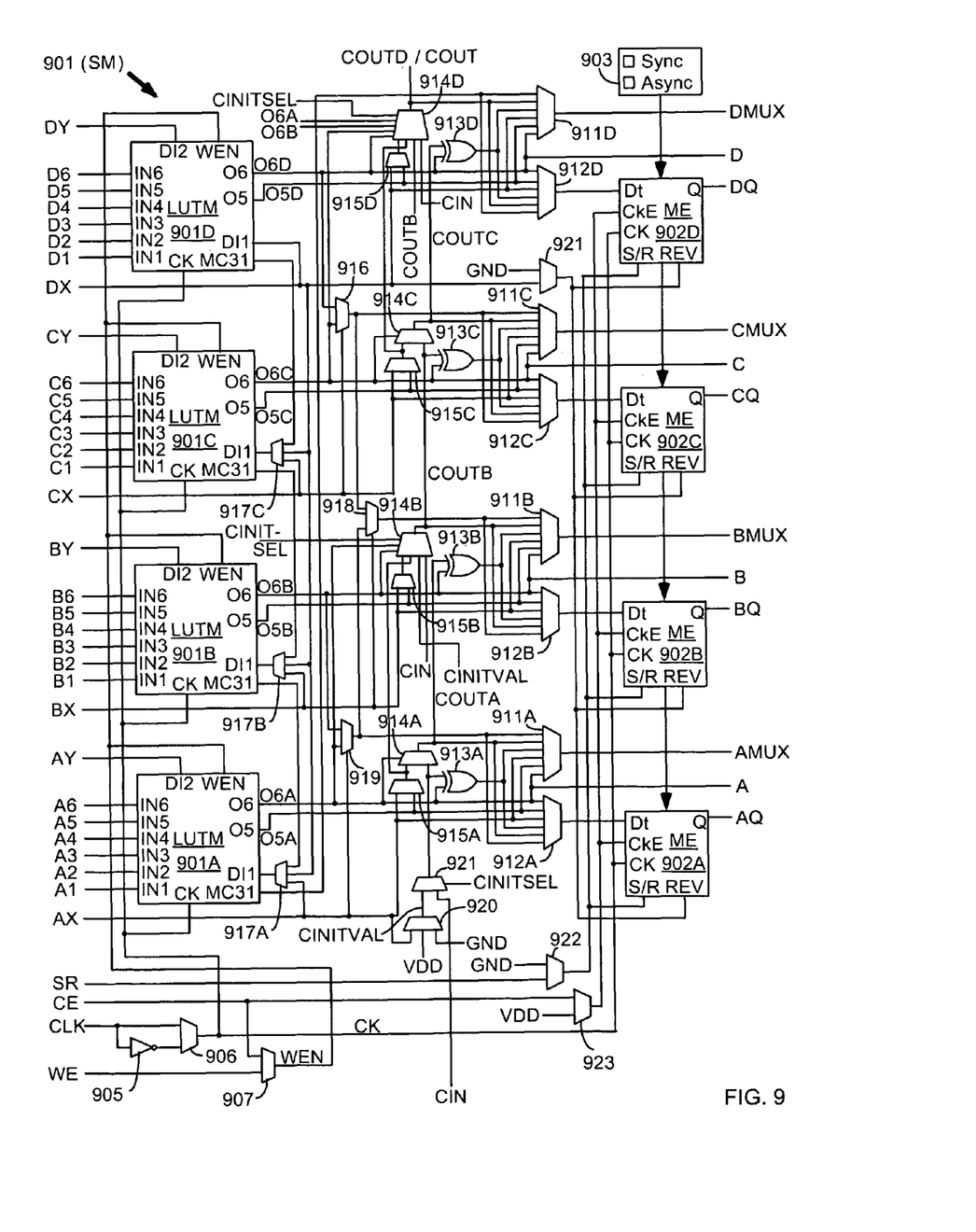
FIG. 9 is a block diagram of a configurable logic element of the circuit of FIG. 8 according to an embodiment of the present invention.

Turning now to FIG. 9, a block diagram of a configurable logic element of the device of FIG. 8 according to an embodiment of the present invention is shown. In particular, FIG. 9 illustrates in simplified form a configurable logic element of a configuration logic block 802 of FIG. 8. In the embodiment of FIG. 9, slice M 1001 includes four lookup tables (LUTMs) 901A-901D, each driven by six LUT data input terminals A1-A6, B1-B6, C1-C6, and D1-D6 and each providing two LUT output signals O5 and O6. The O6 output terminals from LUTs 901A-901D drive slice output terminals A-D, respectively. The LUT data input signals are supplied by the FPGA interconnect structure via input multiplexers, and the LUT output signals are also supplied to the interconnect structure. Slice M also includes: output select multiplexers 911A-911D driving output terminals AMUX-DMUX; multiplexers 912A-912D driving the data input terminals of memory elements 902A-902D; combinational multiplexers 916, 918, and 919; bounce multiplexer circuits 922-923; a circuit represented by inverter 905 and multiplexer 906 (which together provide an optional inversion on the input clock path); and carry logic comprising multiplexers 914A-914D, 915A-915D, 920-921 and exclusive OR gates 913A-913D. All of these elements are coupled together as shown in FIG. 9. Where select inputs are not shown for the multiplexers illustrated in FIG. 9, the select inputs are controlled by configuration memory cells. That is, configuration bits of the configuration bitstream stored in configuration memory cells are coupled to the select inputs of the multiplexers to select the correct inputs to the multiplexers. These configuration memory cells, which are well known, are omitted from FIG. 9 for clarity, as well as from other selected figures herein.

In the pictured embodiment, each memory element 902A-902D may be programmed to function as a synchronous or asynchronous flip-flop or latch. The selection between synchronous and asynchronous functionality is made for all four memory elements in a slice by programming Sync/Asynch selection circuit 903. When a memory element is programmed so that the S/R (set/reset) input signal provides a set function, the REV input terminal provides the reset function. When the memory element is programmed so that the S/R input signal provides a reset function, the REV input terminal provides the set function. Memory elements 902A-902D are clocked by a clock signal CK, which may be provided by a global clock network or by the interconnect structure, for example. Such programmable memory elements are well known in the art of FPGA design. Each memory element 902A-902D provides a registered output signal AQ-DQ to the interconnect structure. Because each LUT 901A-901D provides two output signals, O5 and O6, the LUT may be configured to function as two 5-input LUTs with five shared input signals (IN1-IN5), or as one 6-input LUT having input signals IN1-IN6.

In the embodiment of FIG. 9, each LUTM 901A-901D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6. When in RAM mode, each LUT functions as a single 64-bit RAM or two 32-bit RAMs with shared addressing. The RAM write data is supplied to the 64-bit RAM via input terminal DI1 (via multiplexers 917A-917C for LUTs 901A-901C), or to the two 32-bit RAMs via input terminals DI1 and DI2. RAM write operations in the LUT RAMs are controlled by clock signal CK from multiplexer 906 and by write enable signal WEN from multiplexer 907, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 901A may also be provided to the general interconnect structure for shift register chaining, via output select multiplexer 911D and CLE output terminal DMUX. The devices having programmable logic and methods of the present invention may be implemented according to the device of FIGS. 8 and 9, or in any device, including any type of integrated circuit having programmable logic.

The circuit may be effectively implemented in a programmable logic device, such as a Virtex 4 FPGA available from Xilinx, Inc. Resources may be estimated with a frame size of 1920×1080 and a frame rate of 30 frames/second. The estimated resources include line buffer 706 and 718 using 10 block RAMs each. Line buffer 716 uses 5 block RAMs, and 1 block RAM for the two memories, such as memories 735 and 746 for storing mean and standard deviation values, adding up to 26 block RAMs. External memory size and bandwidth for the top five rows of three previous images and the mean and the standard deviation of the 8×8 blocks of the previous image are stored in the external memory and updated with every new image. Accordingly, the required external memory size is approximately 1920×5×3×8 bits+ ((1920×1080)/(8×8))×32 bits=1,267,200 bits≈1.3 Mbits. For each new image, the data in the external memory are read and updated. The top five rows of oldest previous image are overwritten with new top five rows from either the original current image or the corrected one as set forth above. Accordingly, the total data read per second is approximately (1920×5×3×8 bits+((1920×1080)/(8×8))×32 bits)×30=38,016,000 bits/s. The total data written per second is approximately (1920×5× 1×8 bits+((1920×1080)/(8×8))×32 bits)×30=33,408,000 bits/s. Finally, the total external memory bandwidth is 71,424,000≈72 Mbit/s.

It can therefore be appreciated that the new and novel integrated circuit and method of providing intensity correction for a video image has been described. It will be appreciated by those skilled in the art that numerous alternatives and equivalents will be seen to exist which incorporate the disclosed invention. As a result, the invention is not to be limited by the foregoing embodiments, but only by the following claims.

We claim:

1. A method of providing intensity correction for frames of a video, the method comprising:
    evaluating a portion of a frame of the video;
    determining a difference in intensity of a current block of the frame with a corresponding block of a previous frame;
    correcting all blocks of the frame with local intensity correction if a first set of parameters is met; and
    correcting the current block of the frame with both global intensity correction and local intensity correction if the first set of parameters is not met.

2. The method of claim 1 wherein correcting all blocks of the frame with local intensity correction if the first set of parameters are met comprises determining if the difference in the intensity of the current block of the frame and the corresponding block of the previous frame exceeds a predetermined threshold and a global gain factor is outside a predetermined range.

3. The method of claim 1 wherein correcting the current block of the frame with both global intensity correction and local intensity correction comprises:
   correcting the current block of the frame using a global gain factor;
   determining a difference in intensity of a current block of the frame with the corresponding block of the previous frame after correcting the current block of the frame using the global gain factor; and
   determining whether to correct the current block of a frame using local intensity correction.

4. The method of claim 3 wherein determining whether to correct the current block of a frame using local intensity correction comprises determining whether a difference in intensity between the current block of the frame and the corresponding block of the previous frame after correcting the current block of the frame using the global gain factor exceeds a second predetermined threshold.

5. The method of claim 4 wherein determining whether to correct the current block of a frame using local intensity correction comprises determining whether the global gain factor is outside a predetermined range.

6. The method of claim 1 further comprising determining whether two previous blocks are distorted and updating a local intensity counter with the number of the distorted block if the two previous blocks are not distorted.

7. The method of claim 6 further comprising correcting the previous block if the two previous blocks in the current frame are distorted.

8. A method of providing intensity correction for frames of a video, the method comprising:
   evaluating a portion of a frame of the video;
   determining a difference in intensity of a current block of the frame with the corresponding block of a previous frame;
   correcting the current block of the frame using a global gain factor if the difference in intensity of the current block of the frame and the corresponding block of the previous frame is less than a predetermined threshold or the global gain factor is within a predetermined range;
   determining a difference in intensity of the current block of the frame and the corresponding block of the previous frame after correcting the current block of the frame using the global gain factor; and
   determining whether to correct the current block of the frame using local intensity correction.

9. The method of claim 8 further comprising performing local intensity correction on a block-by-block basis for each block of the frame if the difference in intensity of the current block of the frame and the corresponding block of the previous frame exceeds a second predetermined threshold and the global gain factor is outside a predetermined range.

10. The method of claim 8 further comprising estimating the global gain factor and correcting a portion of the frame using the global gain factor before determining a difference in intensity of the current block of the frame with the corresponding block of the previous frame.

11. The method of claim 8 wherein determining whether to correct the current block of a frame using local intensity correction comprises comparing the difference in intensity of the current block of the frame and the corresponding block of the previous frame after correcting the current block of the frame using the global gain factor to a second predetermined threshold and determining whether the global gain factor is outside a predetermined range.

12. The method of claim 11 further comprising determining whether the difference in intensity of the current block of the frame and the corresponding block of the previous frame after correcting the current block of the frame using the global gain factor has exceeded the second predetermined threshold and determining whether the global gain factor is within the predetermined range.

13. The method of claim 12 further comprising determining whether two previous blocks are distorted and updating a local intensity counter with the number of the distorted block if the two previous blocks are not distorted.

14. The method of claim 13 further comprising correcting the previous block if the two previous blocks in the current frame are distorted.

15. An integrated circuit having a circuit for providing intensity correction for frames of a video, the integrated circuit comprising:
   a buffer coupled to receive frames of data associated with the video;
   a processor coupled to the buffer, the processor analyzing a portion of a frame of the video, wherein the processor corrects all of the blocks of the frame with local intensity correction if the difference in the intensity of a corrected portion of the current frame and a corresponding portion of the previous frame is greater than a predetermined threshold and a global gain factor is outside a predetermined range; and
   a memory coupled to the processor, the memory receiving corrected intensity coefficients for the frame generated by the processor.

16. The integrated circuit of claim 15 wherein the corrected portion of the current frame and the corresponding portion of the previous frame comprise the top five rows of the current frame and the top five rows of the previous frame.

17. The integrated circuit of claim 15 wherein the processor corrects the current block of the frame if the difference in the intensity of the current block of the frame and the corresponding block of the previous frame is less than a predetermined threshold or the global gain factor is within a predetermined range by:
   correcting the current block of the frame using a global gain factor;
   determining a difference in intensity of the current block of the frame and the corresponding block of the previous frame after correcting the current block of the frame using the global gain factor; and
   determining whether to correct the current block of a frame using local intensity correction.

18. The integrated circuit of claim 17 wherein the processor determines whether to correct the current block of a frame using local intensity correction by determining whether the difference in intensity of the current block of the frame and the corresponding block of the previous frame after correcting the current block of the frame using the global gain factor exceeds a second predetermined threshold.

19. The integrated circuit of claim 18 wherein the processor determines whether to correct the current block of a frame using local intensity correction by determining whether the global gain factor is outside a predetermined range.

20. The integrated circuit of claim 15 wherein the processor further determines whether two previous blocks are distorted and updating a local intensity counter with the number of the distorted block if the two previous blocks are not distorted or correcting the previous block if the two previous blocks in the current frame are distorted.

* * * * *